US009258628B2

(12) United States Patent
Strasser et al.

(10) Patent No.: US 9,258,628 B2
(45) Date of Patent: Feb. 9, 2016

(54) METHOD AND APPARATUS FOR TRANSFERRING WDM SIGNALS BETWEEN DIFFERENT WAVELENGTH DIVISION MULTIPLEXED OPTICAL COMMUNICATIONS SYSTEMS IN AN OPTICALLY TRANSPARENT MANNER

(75) Inventors: Thomas Andrew Strasser, Warren, NJ (US); Per Bang Hansen, Rumson, NJ (US); Jefferson L. Wagener, Morristown, NJ (US)

(73) Assignee: LinkedIn Corporation, Mountain View, CA (US)

( * ) Notice: Subject to any disclaimer, the term of this patent is extended or adjusted under 35 U.S.C. 154(b) by 657 days.

(21) Appl. No.: 12/259,946

(22) Filed: Oct. 28, 2008

(65) Prior Publication Data
US 2009/0142060 A1  Jun. 4, 2009

Related U.S. Application Data

(63) Continuation of application No. 10/099,888, filed on Mar. 15, 2002, now abandoned.

(60) Provisional application No. 60/276,310, filed on Mar. 16, 2001.

(51) Int. Cl.
  *H04J 14/02* (2006.01)
  *H04Q 11/00* (2006.01)
  (Continued)

(52) U.S. Cl.
  CPC .......... *H04Q 11/0005* (2013.01); *G02B 6/2938* (2013.01); *G02B 6/29367* (2013.01);
  (Continued)

(58) Field of Classification Search
  CPC .............. H04J 14/0204; H04J 14/0205; H04J 14/0206; H04J 14/021; H04J 14/0212; H04J 14/0217; H04J 14/022; H04J 14/0283; H04J 14/0286; H04Q 11/0005
  USPC .......................................................... 398/79
  See application file for complete search history.

(56) References Cited

U.S. PATENT DOCUMENTS

| 5,504,609 A | 4/1996 | Alexander et al. |
| 5,557,439 A | 9/1996 | Alexander et al. |

(Continued)

OTHER PUBLICATIONS

"Optical Network: a Practical Perspective" by R. Ramaswami et al., Academic Press, 1998, pp. 90-92.*

(Continued)

*Primary Examiner* — Shi K Li
(74) *Attorney, Agent, or Firm* — Schwegman Lundberg & Woessner, P.A.

(57) ABSTRACT

In a WDM optical communication system that includes a plurality of nodes interconnected by communication links, a node is provided which includes an optical coupling arrangement having at least one input port for receiving a WDM signal and a plurality of output ports for selectively receiving one or more wavelength components of the WDM optical signal. The optical coupling arrangement is adaptable to reconfigure its operational state to (i) selectively direct any one of the wavelength components received on the input port to any of the output ports independently of any other of the wavelength components and (ii) selectively direct any combination of two or more of the wavelength components from the input port to at least two of the output ports that serve as WDM output ports. At least one optical WDM interface is optically coupled to a first of the WDM output ports. The optical WDM interface is adapted to receive, at different times, a transponder and a transmission link through which a WDM signal can be communicated. At least one transponder is coupled to a second of the WDM output ports.

3 Claims, 7 Drawing Sheets

COMMUNICATION SYSTEM TO ADD/DROP SIGNALS ONTO SUBTENDING RINGS
(1 FIBER OF UNIDIRECTIONAL RING OR A SINGLE FIBER BIDIRECTIONAL RING)

(51) Int. Cl.
*G02B 6/293* (2006.01)
*G02B 6/35* (2006.01)

(52) U.S. Cl.
CPC ........ *G02B6/29383* (2013.01); *G02B 6/29391* (2013.01); *G02B 6/29395* (2013.01); *G02B 6/356* (2013.01); *H04J 14/021* (2013.01); *H04J 14/022* (2013.01); *H04J 14/0204* (2013.01); *H04J 14/0205* (2013.01); *H04J 14/0212* (2013.01); *H04J 14/0217* (2013.01); *H04J 14/0283* (2013.01); *H04J 14/0286* (2013.01); *G02B 6/357* (2013.01); *G02B 6/3512* (2013.01); *G02B 6/3548* (2013.01); *G02B 6/3578* (2013.01); *G02B 6/3582* (2013.01); *H04J 14/0206* (2013.01); *H04Q 2011/003* (2013.01); *H04Q 2011/0016* (2013.01); *H04Q 2011/0024* (2013.01); *H04Q 2011/0052* (2013.01); *H04Q 2011/0079* (2013.01)

(56) References Cited

U.S. PATENT DOCUMENTS

| | | | |
|---|---|---|---|
| 5,608,825 A | 3/1997 | Ip | |
| 5,712,932 A | 1/1998 | Alexander et al. | |
| 5,909,295 A | 6/1999 | Li et al. | |
| 5,953,141 A | 9/1999 | Liu et al. | |
| 6,005,694 A | 12/1999 | Liu | |
| 6,046,833 A | 4/2000 | Sharma et al. | |
| 6,067,389 A | 5/2000 | Fatehi et al. | |
| 6,084,694 A | 7/2000 | Milton et al. | |
| 6,097,859 A | 8/2000 | Solgaard et al. | |
| 6,101,011 A | 8/2000 | Taylor | |
| 6,151,157 A | 11/2000 | Ball et al. | |
| 6,192,060 B1 | 2/2001 | Kobayashi | |
| 6,192,172 B1 | 2/2001 | Fatehi et al. | |
| 6,192,174 B1 | 2/2001 | Lee | |
| 6,198,857 B1 | 3/2001 | Grasis et al. | |
| 6,288,811 B1* | 9/2001 | Jiang et al. | 398/79 |
| 6,449,073 B1* | 9/2002 | Huber | 398/82 |
| 6,466,341 B1* | 10/2002 | Lumish et al. | 398/82 |
| 6,501,877 B1* | 12/2002 | Weverka et al. | 385/31 |
| 6,587,470 B1* | 7/2003 | Elliot et al. | 370/404 |
| 6,631,222 B1 | 10/2003 | Wagener et al. | |
| 6,947,670 B1* | 9/2005 | Korotky et al. | 398/59 |
| 2001/0040710 A1 | 11/2001 | Sharratt et al. | |
| 2002/0030867 A1* | 3/2002 | Iannone et al. | 359/124 |
| 2002/0067888 A1 | 6/2002 | Morozov et al. | |
| 2002/0135836 A1* | 9/2002 | Shimizu | 359/124 |
| 2002/0145779 A1 | 10/2002 | Strasser et al. | |

OTHER PUBLICATIONS

Daniel J. Blumenthal, "The S3 of MEMS-based Photonic Switches:Scalability, SIze and Serviceability," Calient Networks, San Jose, CA, Nov. 22, 2000.

Stephen B. Alexander et al., "A Precompetitive Consortium on Wide-Band All-Optical Networks," Journal of Lightwave Technology, vol. 11, No. 5/6, May/Jun. 1993, pp. 714-735.

Kobrinski et al., "Applications of Automated Cross-Connection in the Optical Layer", 25th European Conference on Optical Communication, Nice, France, Sep. 27-30, 1999. Regular and Invited Papers, FR. Sep. 26, 1999, p. 1-64.

\* cited by examiner

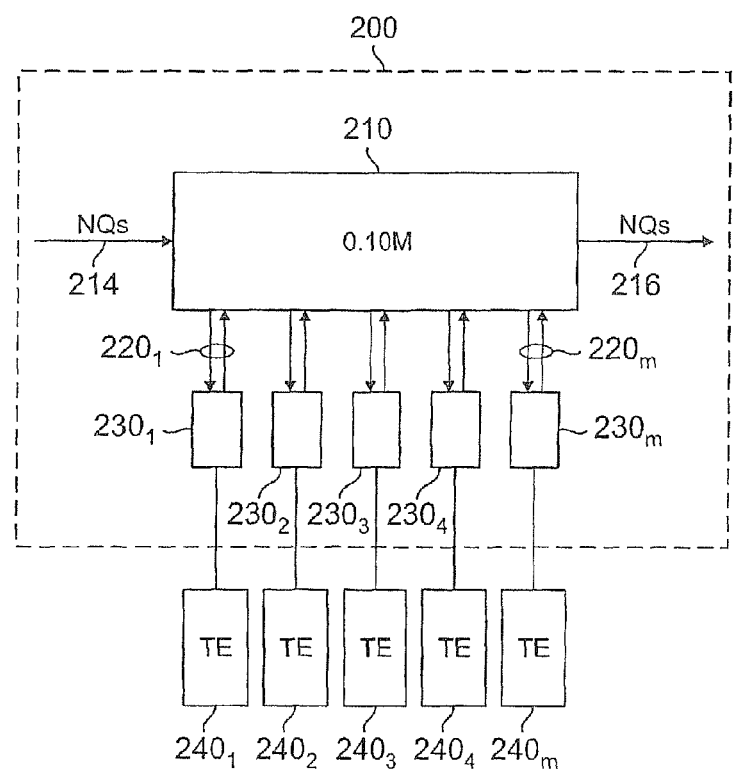
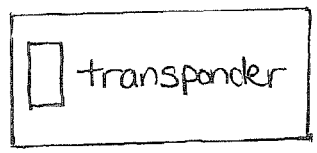
FIG. 2
(PRIOR ART)

COMMUNICATION SYSTEM TO ADD/DROP SIGNALS ONTO SUBTENDING RINGS
(1 FIBER OF UNIDIRECTIONAL RING OR A SINGLE FIBER BIDIRECTIONAL RING)

BIDIRECTIONAL INPUTS/OUTPUTS WITH
INDEPENDENT WAVELENGTH DISTRIBUTION

METHOD AND APPARATUS FOR TRANSFERRING WDM SIGNALS BETWEEN DIFFERENT WAVELENGTH DIVISION MULTIPLEXED OPTICAL COMMUNICATIONS SYSTEMS IN AN OPTICALLY TRANSPARENT MANNER

STATEMENT OF RELATED APPLICATIONS

This is a continuation of U.S. patent application Ser. No. 10/099,888, filed Mar. 15, 2002, entitled "Method and Apparatus For Transferring WDM Signals Between Different Wavelength Division Multiplexed Optical Communications Systems In An Optically Transparent Manner," which claims the benefit of U.S. Provisional Patent Application Ser. No. 60/276,310, filed Mar. 16, 2001, entitled "Reconfigurable Optical System." Both of the prior applications are incorporated by reference in their entireties herein.

FIELD OF THE INVENTION

The invention relates generally to wavelength division multiplexed optical communications systems, and more particularly to an interconnection device for transferring WDM signals between different wavelength division multiplexed optical communications systems in an optically transparent manner.

BACKGROUND OF THE INVENTION

WDM systems have been deployed in long distance networks in a point-to-point configuration consisting of end terminals spaced from each other by one or more segments of optical fiber. In metropolitan areas, however, WDM systems having a ring or loop configuration are currently being developed. Such systems typically include a plurality of nodes located along the ring. At least one optical add/drop element, associated with each node, is typically connected to the ring with optical connectors. The optical add/drop element permits both addition and extraction of channels to and from the ring. A particular node that allows the addition and extraction of all the channels is commonly referred to as a hub or central office node, and typically has a plurality of associated add/drop elements for transmitting and receiving a corresponding plurality of channels to/from other nodes along the ring.

FIG. 1 shows a functional block diagram of a conventional WDM ring network 100. Ring network 100 includes a plurality of nodes 102-105 connected along a continuous, or looped, optical path 110. Each of these nodes is typically linked by a segment of optical fiber.

FIG. 2 shows an exemplary node 200 in more detail. Typically nodes 102-108 have a construction similar to node 200. Node 200 generally includes an optical add/drop multiplexer (OADM), user interfaces, and a network management element. In the case of node 200, OADM 210 includes trunk ports 214 and 216, which are connected to optical path 110 for receiving and transmitting the WDM signals traversing the ring network 100. OADM 210 also includes local ports $220_1$, $220_2$, $220_3$, ... $220_m$ that serve as sources and sinks of traffic. Local ports $220_1$, $220_2$, $220_3$, ... $220_m$ are respectively connected to transponders $230_1$, $230_2$, $230_3$, ... $230_m$. Each local port includes an add and a drop port so that each transponder serves as an access point to the ring network 100 for traffic to and from external users denoted by terminal equipment $240_1$, $240_2$, $240_3$, ... $240_m$ (e.g., Internet routers, LANS, and individual users). Signals between the transponders and the terminal equipment may be communicated in optical or electric form depending on the nature of the equipment.

FIG. 3 shows a functional block diagram of a network 300 consisting of two interconnected rings 310 and 320. Ring network 310 includes OADM nodes 312, 314, 316 and 318. Ring network 320 includes OADM nodes 322, 324, 326, and 328. The rings 310 and 320 are interconnected at a central office node 330, which incorporates OADM node 316 of ring 310 and OADM node 328 of ring 320. Central office node 330 also includes an optical cross-connect (OXC) 340 that communicates with OADM nodes 316 and 328. The OXC 340 is more flexible than an OADM and in some cases can redistribute the individual channel wavelengths onto any number of output paths. Unfortunately, regardless of whether the OXC core switch is optical or electrical, current OXC's generally employ optoelectronic regeneration at their network interfaces, thus requiring optical-to-electrical interfaces into and out of the cross-connect. The regeneration has historically been needed at such network interfaces because of propagation limitations of the optical signal due to loss, amplifier noise, chromatic dispersion, and or polarization mode dispersion. Therefore OXCs with optical switching in the core of the fabric still require regeneration, however as transmission methods improve to mitigate the aforementioned transmission limitations, it would be desirable to pass through an all optical OXC without OEO regeneration to avoid the extensive cost this entails. However, the current generation of OXCs have a relatively high insertion loss, which might still require regeneration, or at a minimum costly optical amplification of all incoming and/or outgoing signals. The high insertion loss arises from passing through three discrete components: wavelength demultiplexer, M×M switch, and then a wavelength multiplexer. In addition to the high insertion loss, such an arrangement gives rise to additional limitations, including the high cost of the components, and a lack of flexibility in routing the light between the input and output subsets of ports. Finally, the current generation of the OXCs has undesirable limitations as a separate network element since it requires space, and must be maintained and configured nominally independently of the elements it is connecting to. Accordingly, it would be desirable to develop a multi-wavelength optical network interface that provides optically transparent signal routing between rings or networks, thereby avoiding the need for a separate OXC network element, including an expensive switch fabric as well as OEO regeneration for the input and/or output of each and every wavelength interconnection in the network.

SUMMARY OF THE INVENTION

The present invention provides, in a WDM optical communication system that includes a plurality of nodes interconnected by communication links, a node that includes an optical coupling arrangement having at least one input port for receiving a WDM signal and a plurality of output ports for selectively receiving one or more wavelength components of the WDM optical signal. The optical coupling arrangement is adaptable to reconfigure its operational state to (i) selectively direct any one of the wavelength components received on the input port to any of the output ports independently of any other of the wavelength components and (ii) selectively direct any combination of two or more of the wavelength components from the input port to at least two of the output ports that serve as WDM output ports. At least one optical WDM interface is optically coupled to a first of the WDM output ports. The optical WDM interface is adapted to receive, at different times, a transponder and a transmission link through which a WDM signal can be communicated. At least one transponder is coupled to a second of the WDM output ports.

In accordance with another aspect of the invention, an interconnection device is provided for communicating in an all-optical manner a WDM signal between at least first and second WDM optical communication systems that each include a plurality of nodes interconnected by communication links. The interconnection device includes a plurality of optical coupling arrangements each operatively associated with a different one of the communications systems for directing in an optically transparent manner wavelength components between the nodes in their respective communication systems. Each of the optical coupling arrangements includes at least one first port for receiving a WDM optical signal from one of the communication systems and a plurality of second ports for selectively receiving any two or more wavelength components of the optical signal. At least one of the optical coupling arrangements is adaptable to route in an optically transparent manner every wavelength component between the first input port and the plurality of second ports independently of every other wavelength component. An optical waveguide supporting at least two wavelength components couples a second output of the first optical coupling arrangement to a second output of the second coupling arrangement.

In accordance with another aspect of the invention, a method is provided for routing three or more wavelength components of a WDM optical signal within a first communication system and between a first communication system and a second communication system. The first communication system includes a first node having a first optical path therethrough for transporting wavelengths components to other nodes in the first communication system and a second optical path therethrough for transporting wavelength components to the second communication system. The method begins by routing in an optically transparent manner any combination of one or more wavelength components through the first optical path of the first node. The method continues by routing in an optically transparent manner over a single optical waveguide any combination of two or more remaining wavelengths components over the second optical path between the first node of the first communication system and a node of the second communication system.

BRIEF DESCRIPTION OF THE DRAWINGS

FIG. 2 shows an exemplary node in detail.

DETAILED DESCRIPTION

The present inventors have recognized that instead of interconnecting ring networks with OADMs and OXCs such an interconnection may be achieved by all-optical reconfigurable switches, which are more flexible than the aforementioned OXCs and which also have much lower insertion losses and are less expensive. An important advantage of all-optical reconfigurable switches for the purposes of the present invention is that they can add or drop any combination of multiple channels onto its WDM ports. Moreover, these switches can individually route the wavelength components between its WDM ports. As used herein the term "route" refers both to the ability to selectively direct selected one or more wavelengths along a given path, while simultaneously being able to prevent the transmission of any other wavelengths not being directed along that same path.

Figure 1:
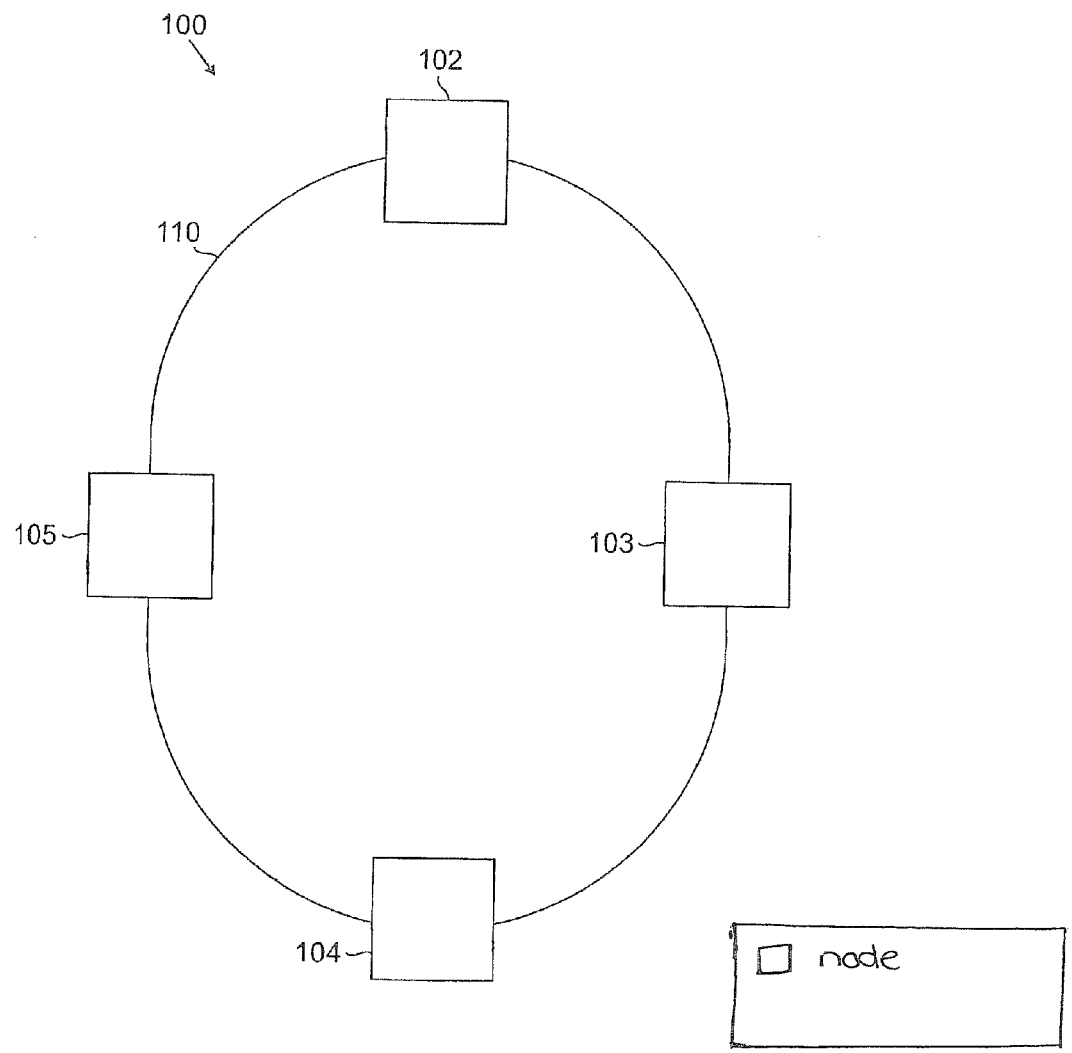
FIG. 1 shows a functional block diagram of a conventional WDM ring network.
Figure 3:
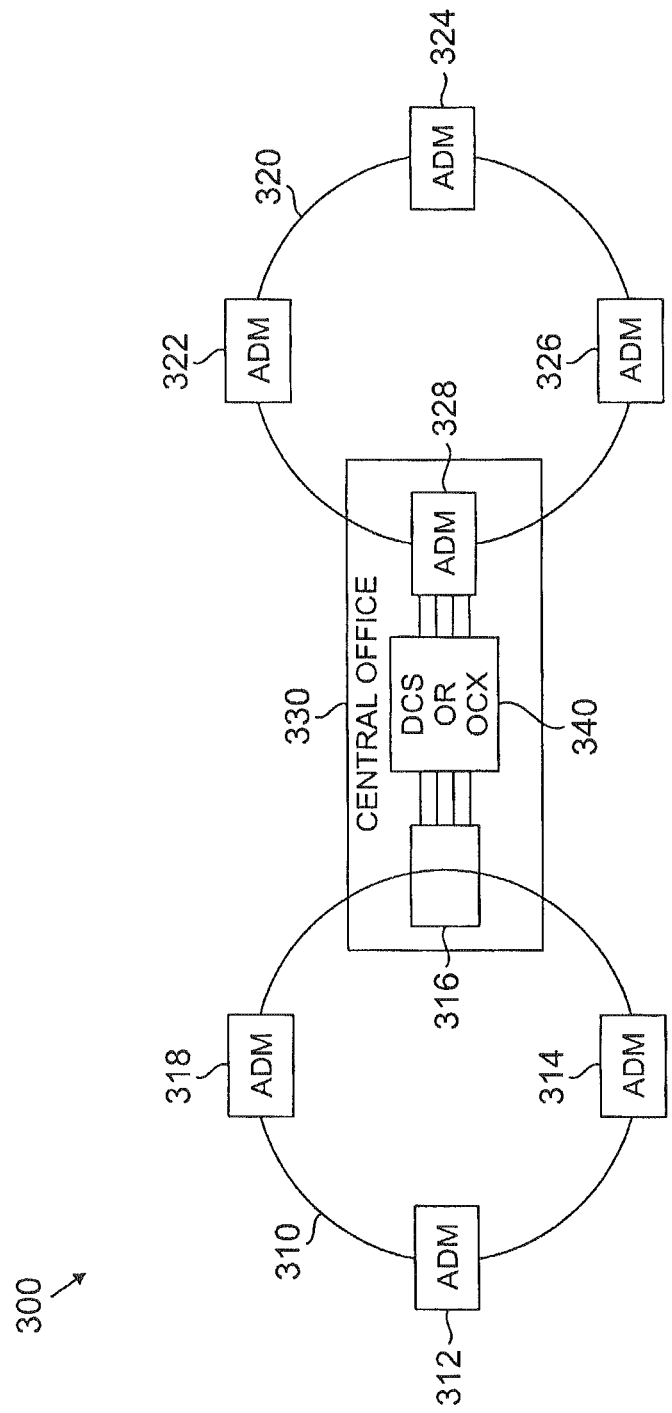
FIG. 3 shows a functional block diagram of a conventional WDM network consisting of two interconnected rings.

Various examples of all-optical reconfigurable optical switches are disclosed in U.S. patent application Ser. No. 09/571,833, which is hereby incorporated by reference in its entirety, and in particular FIGS. 2-4 of that reference. The switching elements disclosed therein can selectively direct any wavelength component from any input port to any output port, independent of the routing of the other wavelengths without the need for any electrical-to-optical conversion. Another all-optical reconfigurable optical switch that provides additional functionality is disclosed in U.S. patent application Ser. Nos. 09/691,812 and 10/870,326, which are hereby incorporated by reference in their entireties. This reference discloses an optical switching element in which each and every wavelength component can be directed from any given port to any other port without constraint. More specifically, unlike most optical switches, this switch is not limited to providing connections between a subset of input ports and a subset of output ports, or vice versa. Rather, this switch can also provide a connection between two ports within the same subset (either input or output). While the present invention may employ any of the aforementioned reconfigurable optical switches, the optical switch disclosed in U.S. patent application Ser. Nos. 09/691,812 and 10/870,326 will serve as an exemplary reconfigurable optical switch, and accordingly, additional details concerning this switch will be presented below.

Figure 7:
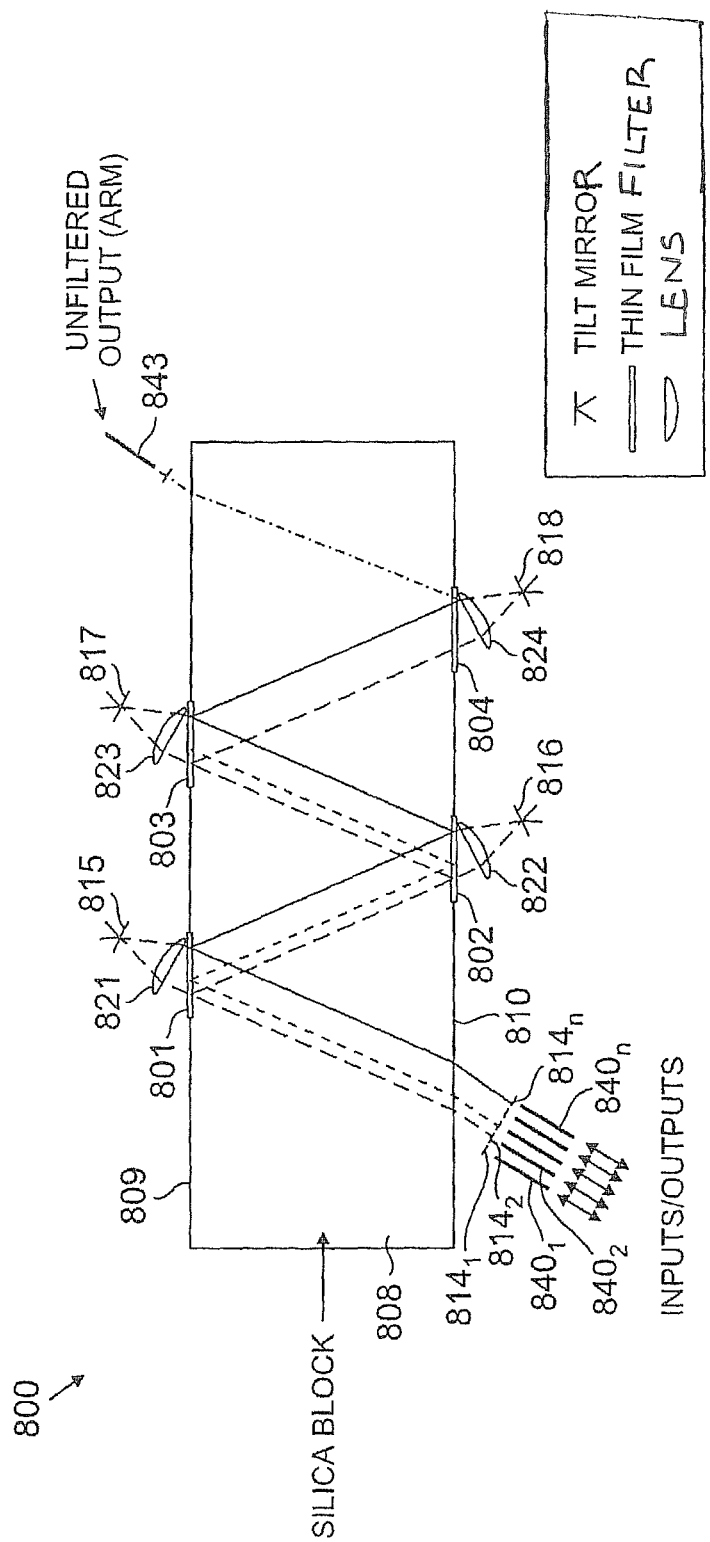
FIG. 7 shows an exemplary reconfigurable all-optical switch that may be employed in the present invention.

In FIG. 7, the reconfigurable optical switch 800 comprises an optically transparent substrate 808, a plurality of dielectric thin film filters 801, 802, 803, and 804, a plurality of collimating lens pairs $821_1$ and $821_2$, $822_2$, and $822_2$, $828_1$, and $823_2$, $824_1$, and $824_2$, a plurality of tiltable mirrors 815, 816, 817, and 818 and a plurality of output ports $840_1$, $840_2$, . . . $840_n$. A first filter array is composed of thin film filters 801 and 803 and a second filter array is composed of thin film filters 802 and 804. Individual ones of the collimating lens pairs 821-824 and tiltable mirrors 815-818 are associated with each of the thin film filters. Each thin film filter, along with its associated collimating lens pair and tiltable mirror effectively forms a narrow band, free space switch, i.e. a switch that routes individual channels or wavelength components along different paths. The tiltable mirrors are micro mirrors such as the MEMS (microelectromechanical systems) mirrors. Alternatively, other mechanisms may be employed to control the position of the mirrors, such as piezoelectric actuators, for example.

In operation, a WDM optical signal composed of different wavelengths $\lambda_1$, $\lambda_2$, $\lambda_3$ and $\lambda_4$ is directed from the optical input port 840 to a collimator lens 814. The WDM signal traverses substrate 808 and is received by thin film filter 801. According to the characteristics of the thin film filter 801, the optical component with wavelength $\lambda_1$ is transmitted through the thin film filter 801, while the other wavelength components are reflected and directed to thin film filter 802 via substrate 808. The wavelength component $\lambda_1$, which is transmitted through the thin film filter 801, is converged by the collimating lens 821₁, onto the tiltable mirror 815. Tiltable mirror 815 is positioned so that wavelength component $\lambda_1$ is reflected from the mirror to a selected one of the output ports 840₁-840ₙ via thin film filters 802-804, which all reflect wavelength component $\lambda_1$. The particular output port that is selected to receive the wavelength component will determine the particular orientation of the mirror 815.

As mentioned, the remaining wavelength components $\lambda_2$, $\lambda_3$, and $\lambda_4$ are reflected by thin film filter 801 through lens 821₂ back into substrate 808 and directed to thin film filter 802. Wavelength component $\lambda_2$ is transmitted through thin film filter 802 and lens 822₁ and directed to a selected output port by tiltable mirror 816 via thin film filters 803-804, which all reflect wavelength component $\lambda_2$. Similarly, all other wavelength components are separated in sequence by the thin film filters 803-804 and subsequently directed by tiltable mirrors 817-818 to selected output ports. By appropriate actuation of the tiltable mirrors, each wavelength component can be directed to an output port that is selected independently of all other wavelength components.

Figure 4:
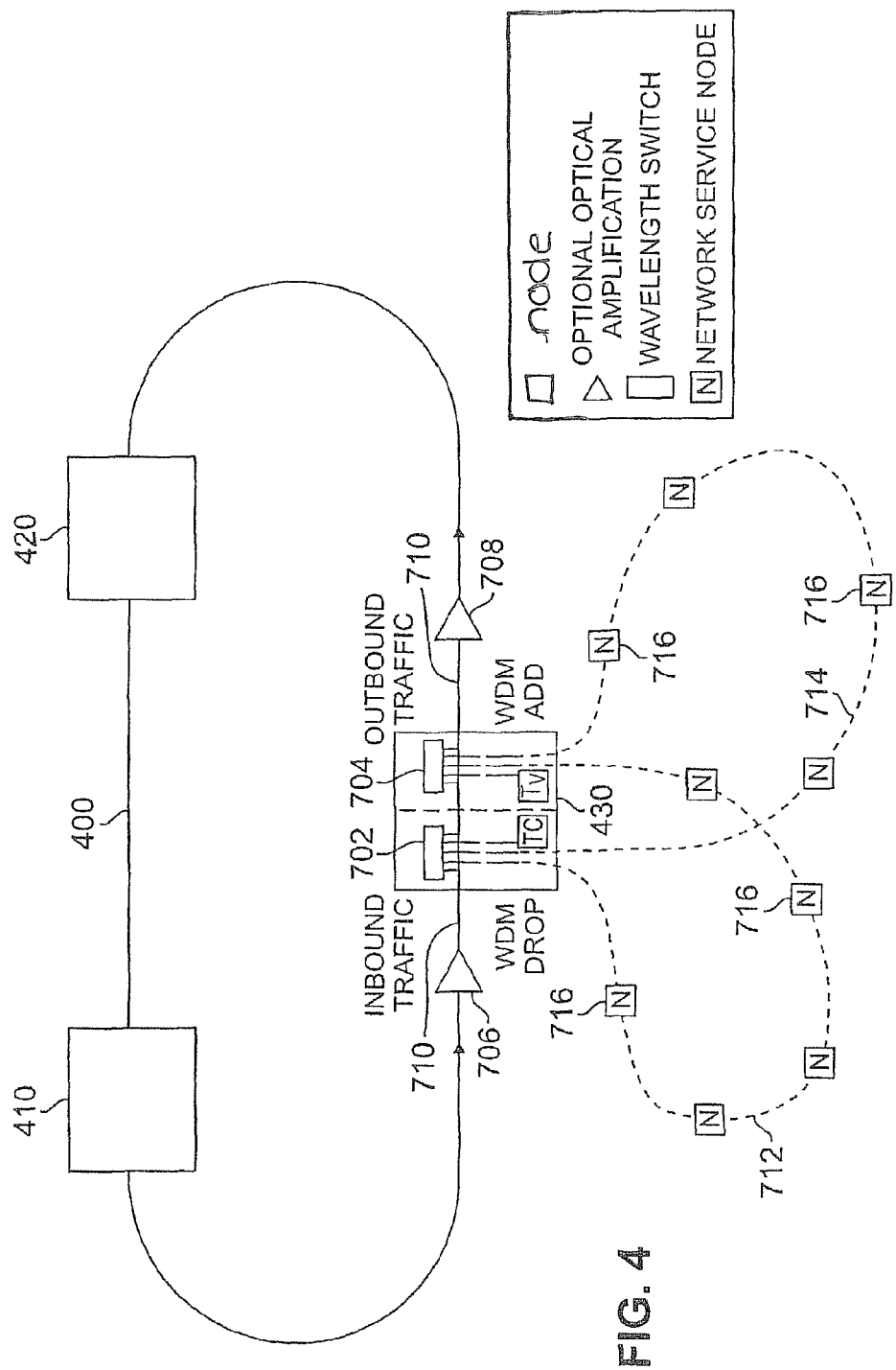
FIG. 4 shows a ring network having secondary subtending rings constructed in accordance with the present invention.

FIG. 4 shows a ring network 400 constructed in accordance with the present invention, which includes a transmission path 710 interconnected by nodes 410, 420 and 430. It should be noted that although transmission path 710 is depicted as a single fiber transmitting in one direction, the entire system can of course be duplicated to support bi-directional communication. Nodes 410 and 420 may be conventional nodes that contain OADMs of the type shown in FIG. 2 for adding and dropping traffic to the ring. Ring network 400 also includes node 430, which may, for convenience, be referred to as a central-office node. Instead of a conventional OADM, central office node 430 includes a pair of serially connected reconfigurable optical switches 702 and 704, which are located in transmission path 710. Because of the additional functionality offered by the reconfigurable optical switches in comparison to OADMs, central-office node 430 can be interconnected with other network arrangements so that it serves as more than simply an access point for adding and dropping traffic. For example, FIG. 4 shows two subtending rings 712 and 714 that originate and terminate at central-office node 430. More specifically, rings 712 and 714 receive channel wavelengths from reconfigurable switch 702 and add channel wavelengths to switch 704.

While FIG. 4 and the figures that follow describe the invention in terms of a ring network, it should be noted that the invention is more generally applicable to any optical communication system regardless of topology. As used herein, an optical communication system refers to a plurality of nodes interconnected by a common optically transparent path while allowing each node to access at least one channel wavelength from a WDM signal traveling on the common path.

Subtending rings 712 and 714 can be employed to enhance the functionality of primary ring 400. For example, rings 712 and 714 can aggregate local traffic from a particular region via network nodes 716 and transparently couple them back to the primary ring 400 in which reconfigurable optical switches 702 and 704 are situated. This arrangement using the reconfigurable optical switches 702 and 704 to support local traffic can be provided because, unlike OADMs, the optical switches can add or drop any combination of multiple channels onto its WDM ports. Moreover, by providing the appropriate amplification and gain flattening, the subtending rings can each be treated from a transmission capability perspective as an extra transmission span. One advantage of this arrangement is that local traffic can be aggregated without the need to enhance the functionality, and hence the cost, of the central-office node 430. Moreover, there is no need to regenerate the traffic at the interface to the primary ring using an expensive optical-to-electrical-to-optical conversion process. That is, the traffic traverses the interface in an optically transparent manner. Since the regenerators represent the major cost in provisioning a new service, the ability to eliminate the regenerators represents a significant cost savings.

Another advantage of the subtending ring arrangement in FIG. 4 arises from the principle that it is generally desirable to collect traffic from as many nodes as possible (and to distribute traffic to as many nodes as possible) while requiring the traffic to traverse as few nodes as possible. The subtending rings accomplish this goal because they can extend the geographic reach of the network without requiring the traffic to traverse the nodes of all of the subtending rings, except, of course, for those subtending rings on which the traffic may originate or terminate. This is an important network improvement because the maximum transmission distance of an optical signal is in part determined by the number of nodes it traverses, because each node contributes signal noise (from loss, crosstalk, and amplification), chromatic dispersion (from fiber and wavelength filters), filter narrowing (from wavelength filters), and polarization mode dispersion from all components. Therefore, the ability to transparently route signals within the network in this manner actually reduces optical signal degradation, thereby improving the maximum reach of those signals without optoelectronic regeneration.

Figure 5:
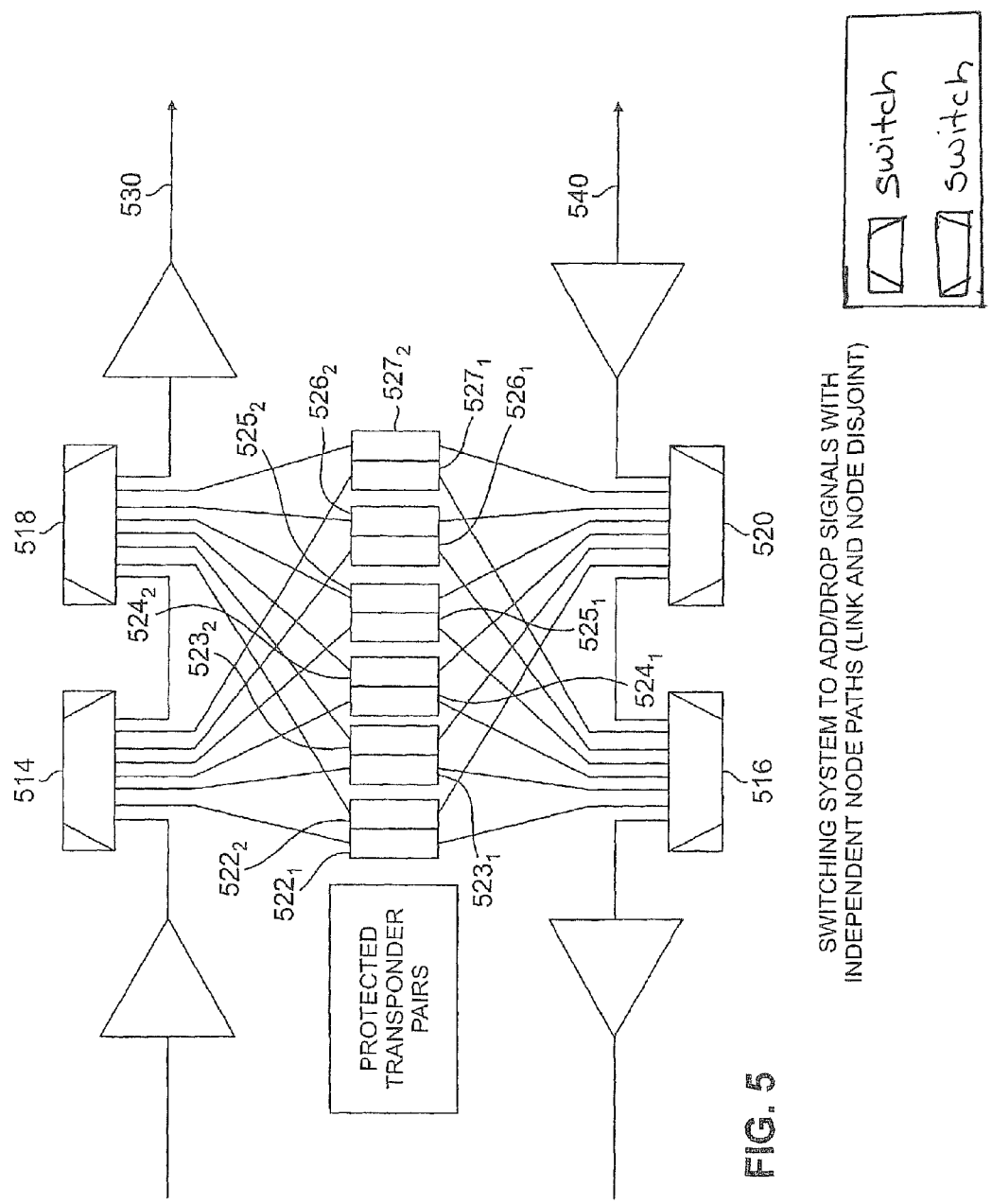
FIG. 5 shows an arrangement of reconfigurable optical switches similar to that depicted in FIG. 4, which is employed in copending U.S. patent application Ser. No. 10/099,890 to provide a protection scheme in the event of a transponder failure.

An arrangement of reconfigurable optical switches such as depicted in FIG. 4 is employed in copending U.S. patent application Ser. No. 10/099,890 to provide a protection scheme in the event of a transponder (i.e., a transmitter/receiver pair in which an optical signal originates as, or terminates in, an electrical signal) failure. This arrangement is shown in FIG. 5, which employs four switches 514, 516, 518 and 520. In comparing FIGS. 4 and 5 it should be noted while FIG. 4 only depicts a single fiber path 710 transmitting in one direction, in FIG. 5 two fibers paths 530 and 540 are shown to support bi-directional communication (i.e., fiber path 710 in FIG. 4 corresponds to either of the fiber paths 530 and 540 in FIG. 5). In the configuration of FIG. 5 service can be maintained even if there is a failure in one of the switches. The transponders are arranged in transponder pairs 522-527 located in adjacent slots. The individual transponders in each pair can serve as backup for the other in case of a failure. The transponders in each pair communicate with different switches. For example, in pair 522, transponder 522₁ receives and transmits via switches 514 and 516, respectively, while transponder 522₂ receives and transmits via switches 520 and 518, respectively. Since the two transponders in each pair transmit and receive on completely different switches, a failure in one switch need not disrupt service because the service provided by the impacted switch can be provided by the other transponder in the adjacent slot. A comparison of FIGS. 4 and 5 suggests that any one or more of the transponder pairs 522-527 in FIG. 5 may be replaced with a subtending ring such as rings 712 and 714 in FIG. 4.

The present inventors have recognized that the slots in which transponder pairs 522 and 527 are located may be replaced with a general-purpose optical interface (GPOI) that can be used in a variety of ways. For example, such an optical interface can be used either to receive transponders, as in FIG. 5, or as an interface through which an additional transmission span may be situated, as in FIG. 4. This type of an interface has an advantage over the prior art, which differentiates between these two service interfaces, and thus requires different equipment for each service which must be anticipated for and installed in the network. Hence prior art interfaces require accurate planning to ensure that all the correct interfaces are correctly installed at the appropriate points in the network where these services will be needed. However, such planning is not necessary if a GPOI in accordance with the present invention is initially built into the network so that it can be used for both optical service termination at a transponder or for transparent routing of an optical service to another physical location or network. If the system is designed in a modular fashion such that the total number of GPOIs is equal to the total number of wavelengths, the network operator will never be unprepared and without provision for these services or applications. Furthermore, the present invention leverages the different types of flexibility of the optical switch to simultaneously supply the benefits of plug and play transponder interface interconnection with an optical interface that can extend the reach of an optical service beyond the immediate vicinity of the optical node. This approach is advantageous because optical interconnections and transponder drops at a node are both applications that in effect consume wavelengths, of which there are a limited number coming into a switch. Therefore, the use of the same pool of resources for both applications is naturally more efficient.

Figure 6:
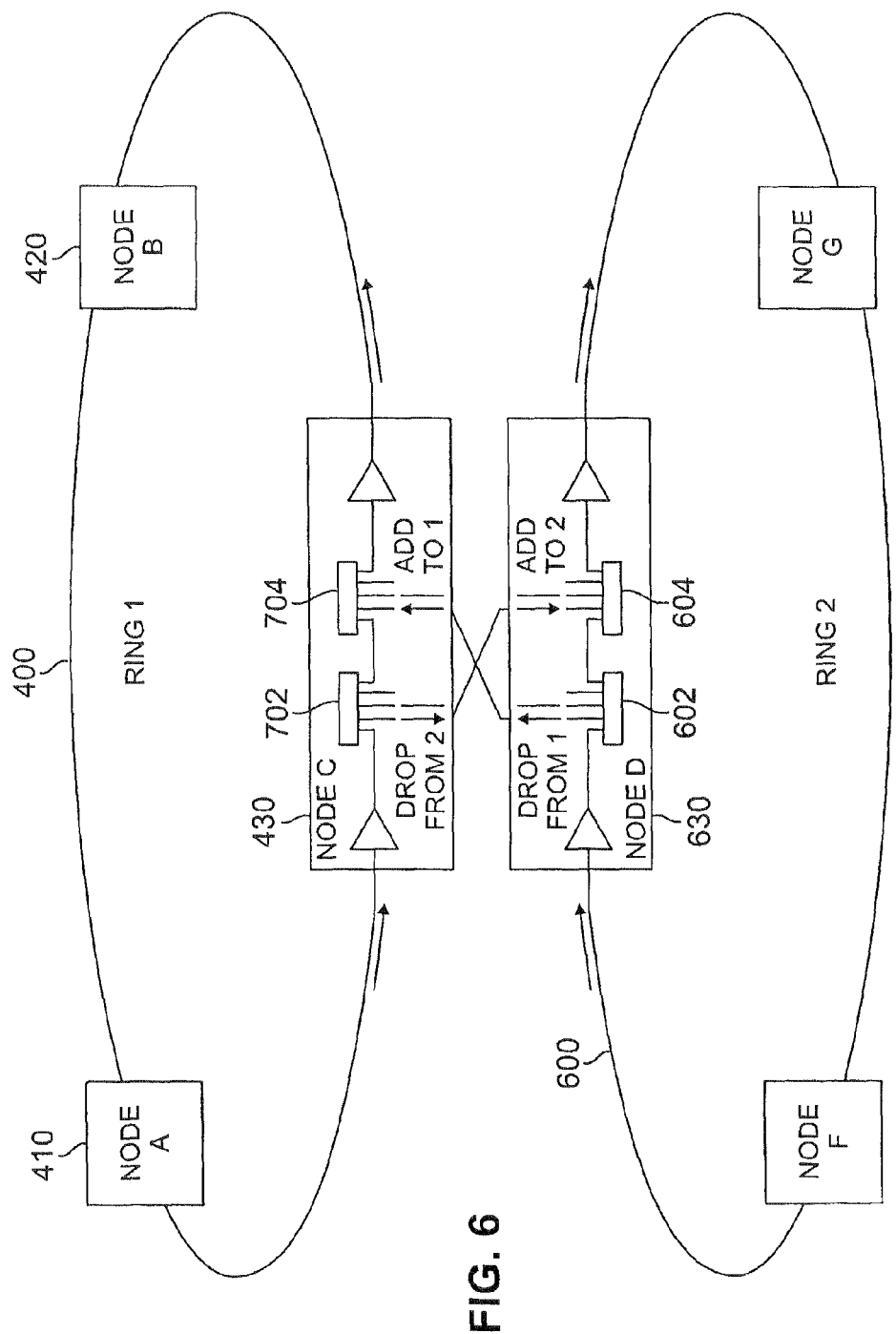
FIG. 6 shows two interconnected ring networks constructed in accordance with the present invention.

FIG. 6 shows another network arrangement that employs ring network 400 from FIG. 4, where the arrangement shown in the drawing is to be duplicated for a second direction in a conventional two fiber unidirectional system. In this arrangement central office node 430 is interconnected to a second ring network 600. Second ring network 600 includes a central office node 630, which, similar to central office node 430, includes two serially connected reconfigurable optical switches 602 and 604. The local ports of switches 602, 604, 702 and 704, which as in FIG. 5 are usually reserved as transponder ports, are used as a cross-connect between the two rings 400 and 600. In this network arrangement, cross-connect traffic is passed to a second ring rather than being looped back to the original ring, as in the arrangement of FIG. 4.

It should be noted that in this arrangement there are two paths for the crossconnect traffic. One path connects from the left side of node 430 to the right side of node 630. The second path connects the right side of node 430 with the left side of node 630. While these dual paths are not strictly necessary, they do provide for diverse routing along the interconnection for path protection of any services that are present. This path protection means that if any switch, amplifier, or fiber connection along one of these paths fails, the service should be able to be restored by traveling in the other direction around its source ring, passing through the second interconnection, and then traveling in the other direction around its destination ring to complete the path. While this configuration provides protection, if there is a failure anywhere along either ring or in the interconnection, a protection path impacting the rest of the network must be used. This is not a problem for services with dedicated protection, where the backup path is always active with a duplicate copy of the service. However, if shared protection is used, a cumbersome protection path must be setup because the rings and interconnects must act in cooperation to setup a given protection path, even though there is presumably only a single portion of that network with a failure. This limitation can be largely mitigated for shared protection applications by providing a duplicate pair of interconnections between nodes 430 and 630, which allows a signal incoming from the left in 430 to node 630, and a signal incoming from the right of node 430 to exit from the right of node 630. With this arrangement it is possible, depending on which interconnection port is used, to determine the routing direction of a given signal when entering a new ring independent of the routing direction in the source ring. Moreover, this arrangement also allows isolation of the protection reconfiguration to the ring or interconnect element that has failed. Consider for example, a signal traveling from node 420 through node 430 to node 630 and which is dropped at node 620. If a failure in ring 400 along the path between node 420 and 430 arises, a protected signal can be routed through node 410 to node 430, at which point it can be dropped along the interconnect port that will pass through a reconfigured switch in node 630 to directly reach node 620. The duplicate interconnection arrangement, which allows the routing direction to be flexibly determined when entering the second ring, requires no change in the lightpath in the ring that exhibited no failure (i.e., node 600). This shared protection arrangement reduces the number of network elements which participate in a protection switch, improving the reliability of the protection as well as reducing its complexity to implement. Finally, it reduces the maximum distance a protection signal must travel through the network along the protection path, which may in many instances allow the protection to be implemented without any optoelectronic regeneration.

The invention claimed is:

1. In a WDM optical communication system that includes a plurality of nodes interconnected by communication links along a first transmission path, a node, comprising:
    a first optical coupling arrangement having at least one transmission path input port for receiving an input WDM optical signal from the first transmission path, the first optical coupling arrangement also having a plurality of subtending ring output ports outside of the first transmission path of the plurality of nodes, the plurality of subtending ring output ports for selectively receiving one or more wavelength components of the input WDM optical signal, said first arrangement being adaptable to reconfigure its operational state to selectively direct any one of the wavelength components received on the first transmission path input port to any of the plurality of subtending ring output ports independently of any other of the wavelength components and without converting the optical signals into electrical signals;
    a second optical coupling arrangement having at least one transmission path output port for providing a provided WDM optical signal onto the first transmission path, the second optical coupling arrangement also having a plurality of subtending ring input ports outside of the first transmission path, the plurality of subtending ring input ports for selectively providing one or more wavelength components onto the provided WDM optical signal, said second arrangement being adaptable to reconfigure its operational state to selectively direct any one of the wavelength components received on any of the plurality of subtending ring input ports onto the provided WDM optical signal independently of any other of the wavelength components and without converting the optical signals into electrical signals, at least one of the first arrangement and the second arrangement lacking amplifiers; and
    a plurality of subtending rings optically coupling the plurality of subtending ring output ports to the plurality of subtending ring input ports in a one-to-one manner, each of the plurality of subtending rings aggregating local traffic via a respective plurality of network nodes disposed along the subtending ring and coupling the local traffic onto the first transmission path without converting the local traffic to or from an electrical signal.

2. The WDM optical communication system in accordance with claim 1, the optical channel being at least part of a subtending network.

3. The WDM optical communication system in accordance with claim 1, wherein both of the first and second arrangements lack amplifiers.

* * * * *